United States Patent
Yonaha

(10) Patent No.: US 11,170,477 B2
(45) Date of Patent: Nov. 9, 2021

(54) IMAGE COMPOSITION APPARATUS, IMAGE COMPOSITION METHOD, AND PROGRAM

(71) Applicant: FUJIFILM Corporation, Tokyo (JP)

(72) Inventor: Makoto Yonaha, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 77 days.

(21) Appl. No.: 16/550,438

(22) Filed: Aug. 26, 2019

(65) Prior Publication Data

US 2019/0378252 A1 Dec. 12, 2019

Related U.S. Application Data

(63) Continuation of application No. PCT/JP2018/006772, filed on Feb. 23, 2018.

(30) Foreign Application Priority Data

Mar. 16, 2017 (JP) ............................. JP2017-051520

(51) Int. Cl.
  *G06T 5/00* (2006.01)
  *G06T 7/00* (2017.01)
  (Continued)

(52) U.S. Cl.
  CPC ................ *G06T 5/006* (2013.01); *G06T 7/13* (2017.01); *G06T 7/70* (2017.01); *G06T 7/97* (2017.01); *G06T 2200/24* (2013.01)

(58) Field of Classification Search
  CPC .. G06T 5/006; G06T 7/97; G06T 7/13; G06T 7/70; G06T 2200/24; G06T 2207/20221; G06T 7/60; G06T 3/4038; H04N 1/3876
  See application file for complete search history.

(56) References Cited

U.S. PATENT DOCUMENTS

2008/0247667 A1 10/2008 Jin et al.
2010/0026717 A1* 2/2010 Sato .......................... G06T 7/13
                                                    345/642
(Continued)

FOREIGN PATENT DOCUMENTS

CN          101266685 A      9/2008
CN          104135926 A     11/2014
(Continued)

OTHER PUBLICATIONS

An Office Action issued by the China National Intellectual Property Administration on Aug. 26, 2020, which corresponds to Chinese Patent Application No. 201880017415.6 and is related to U.S. Appl. No. 16/550,438 with English language translation.

(Continued)

*Primary Examiner* — Siamak Harandi
(74) *Attorney, Agent, or Firm* — Studebaker & Brackett PC

(57) ABSTRACT

An image composition apparatus includes an image obtaining unit 22 that obtains a first image and a second image obtained by imaging a target object and an obstacle from a first direction and a second direction, a region specifying unit 34 that specifies a target object region by receiving a region designation indicating the target object region in which the target object is captured and the obstacle is not captured on the first image and the second image displayed on a display screen of a display unit 24, a correspondence point information obtaining unit 36 that obtains correspondence point information indicating correspondence points between the first image and the second image, a geometric transformation information obtaining unit 38 that obtains geometric transformation information based on the correspondence point information, a geometric transformation unit 40 that geometrically transforms the target object region of the second image based on the geometric transformation (Continued)

information, and an image composition unit 42 that generates a composite image by compositing the target object region of the first image with the geometrically transformed target object region of the second image.

10 Claims, 11 Drawing Sheets

(51) Int. Cl.
*G06T 7/13* (2017.01)
*G06T 7/70* (2017.01)

(56) References Cited

U.S. PATENT DOCUMENTS

| | | | |
|---|---|---|---|
| 2012/0262569 A1 | 10/2012 | Cudak et al. | |
| 2015/0125030 A1 | 5/2015 | Suzuki et al. | |
| 2015/0253880 A1* | 9/2015 | Luo | G06K 9/46 345/179 |
| 2016/0188992 A1* | 6/2016 | Hiraga | G06K 9/4604 382/199 |
| 2019/0378252 A1* | 12/2019 | Yonaha | G06T 7/97 |

FOREIGN PATENT DOCUMENTS

| | | |
|---|---|---|
| JP | 2004-021578 A | 1/2004 |
| JP | 2007-164258 A | 6/2007 |
| JP | 2007-305050 A | 11/2007 |
| JP | 2009-055332 A | 3/2009 |
| JP | 2010-041586 A | 2/2010 |
| JP | 2011-023814 A | 2/2011 |
| JP | 2016-213578 A | 12/2016 |
| JP | 2017-005288 A | 1/2017 |

OTHER PUBLICATIONS

The extended European search report issued by the European Patent Office dated Feb. 5, 2020, which corresponds to European Patent Application No. 18767832.1-1209 and is related to U.S. Appl. No. 16/550,438.

Sasahara, Shota, et al., "Realtime obstruct erasing system with multi cameras," The Virtual Reality Society of Japan, non-official translation (The 10th Commemoration Meeting of the Virtual Reality Society of Japan), Sep. 27, 2005, pp. 27-30.

International Search Report issued in PCT/JP2018/006772; dated May 15, 2018.

International Preliminary Report on Patentability and Written Opinion issued in PCT/JP2018/006772; dated Sep. 17, 2019.

An Office Action mailed by the State Intellectual Property Office of the People's Republic of China dated Mar. 9, 2021, which corresponds to Chinese Patent Application No. 201880017415.6 and is related to U.S. Appl. No. 16/550,438; with English language translation.

An Office Action mailed by the State Intellectual Property Office of the People's Republic of China dated Aug. 24, 2021, which corresponds to Chinese Patent Application No. 201880017415.6. and is related to U.S. Appl. No. 16/550,438; with English language translation.

\* cited by examiner

IMAGE COMPOSITION APPARATUS, IMAGE COMPOSITION METHOD, AND PROGRAM

CROSS-REFERENCE TO RELATED APPLICATIONS

The present application is a Continuation of PCT International Application No. PCT/JP2018/006772 filed on Feb. 23, 2018 claiming priority under 35 U.S.C § 119(a) to Japanese Patent Application No. 2017-051520 filed on Mar. 16, 2017. Each of the above applications is hereby expressly incorporated by reference, in its entirety, into the present application.

BACKGROUND OF THE INVENTION

1. Field of the Invention

The present invention relates to an image composition apparatus, an image composition method, and a program capable of securely generating a composite image in which an obstacle image is canceled out from a plurality of images including the obstacle image.

2. Description of the Related Art

In the related art, a technology for generating one image from a plurality of images is known.

In order to resolve a problem such that it is difficult to obtain an image having a wide range and a high definition and not having an accumulation of error accompanied by a connection process, JP2007-164258A discloses a technology for compositing a wide angle image with a telephoto image. Specifically, a wide angle image and a telephoto image captured from the same imaging position are obtained. Four or more sets of correspondence points (composition reference points) between the wide angle image and the telephoto image are designated by a manual operation. A projective transformation expression is calculated based on the four or more sets of designated correspondence points. The telephoto is projectively transformed using the calculated projective transformation expression. The projectively transformed telephoto image is composited in the wide angle image.

In order to resolve the same problem as JP2007-164258A, JP2004-021578A discloses a technology for connecting a plurality of divided images after image distortion correction. Specifically, four or more points having known coordinate values are designated by a manual operation. Image distortion of each image is corrected based on the coordinate values of the four or more designated points. The plurality of images in which the image distortion is corrected are connected.

In addition, a technology for automatically complementing a region in which an obstacle is captured in an image in a case where an imaging condition has regularity is known.

JP2017-005288A discloses a technology for complementing a shade region caused by a doctor present between a fixedly installed camera and a surgical body part in a surgery. Specifically, a projective transformation matrix (projection parameter) between camera images is calculated in advance. Regions of the head and the hands of the doctor are detected as the shade region based on the characteristics such as the color and shape of objects (a surgical cap, a surgical glove, and the like) worn by the doctor. The shade region is complemented using the projective transformation matrix calculated in advance.

JP2009-055332A discloses a technology for installing a first camera at a position at which an obstacle can be imaged, installing a second camera at a position at which the background of the obstacle is imaged, and compositing a video of the background of the obstacle imaged by the second camera in a video including an obstacle image captured by the first camera. Specifically, an object that is captured in the video of the first camera and is not captured in the video of the second camera is detected as the obstacle. A projective transformation matrix (transformation parameter) is calculated by extracting four correspondence points between the video of the first camera and the video of the second camera. The video of the second camera is transformed using the calculated projective transformation matrix and is overlaid on the video of the first camera in a semi-transparent manner.

In the disclosure of JP2016-213578A, in the case of generating any viewpoint image, a region not having correspondence points between a plurality of images is detected as a shade region. A projective transformation matrix (projective transformation coefficient) is obtained using a set of correspondence points between detected images. The shade region is complemented using the projective transformation matrix.

SUMMARY OF THE INVENTION

In reality, it may be difficult to generate a composite image in which an obstacle image is canceled out from a plurality of images including the obstacle image.

In JP2007-164258A and JP2004-021578A, the technology for obtaining an image not having an accumulation of error accompanied by the connection process is disclosed, but there is no disclosure or suggestion with respect to means for resolving a problem such that it is difficult in reality to generate the composite image in which the obstacle image is canceled out. In JP2007-164258A and JP2004-021578A, the designation of the correspondence points or the point for the image distortion correction by a manual operation is disclosed, but the manual operation is not for canceling out the obstacle image.

In the configuration of the technology disclosed in JP2017-005288A, it is assumed that imaging is performed by the fixedly installed camera having regularity in the imaging condition (intrinsic and extrinsic parameters of the camera), and the projective transformation matrix (projection parameter) between the camera images is calculated in advance. Thus, in a case where the imaging condition significantly changes, it is considered to be difficult to cancel out the obstacle image. In addition, while an obstacle region (shade region) is detected with focus on the objects worn by the doctor as the obstacle (shading object) based on the characteristics such as the color and shape of the worn objects, it is difficult to detect the obstacle region under an imaging condition that the characteristics such as the color and shape of the obstacle are not clear or not determined.

In the technology disclosed in JP2009-055332A, the video of the background of the obstacle almost cannot be obtained under an imaging condition that the camera cannot be arranged at the position at which the background of the obstacle is imaged.

In the technology disclosed in JP2016-213578A, the shade region cannot be detected under an imaging condition that the number of detectable correspondence points is small.

As disclosed in JP2007-164258A, JP2004-021578A, JP2017-005288A, JP2009-055332A, and JP2016-213578A, the generation of one image from a plurality of images, the use of the projective transformation, the designation of the correspondence points or the point for the image distortion correction by a manual operation, and the complementation of the obstacle region using the regularity of the imaging condition are well known. However, documents disclosing or suggesting a configuration capable of generating the composite image in which the obstacle image is canceled out even in a case where the imaging condition significantly changes are not found. Even in a case where the disclosures of JP2007-164258A, JP2004-021578A, JP2017-005288A. JP2009-055332A. and JP2016-213578A are combined, it is considered that the composite image in which the obstacle image is canceled out can be generated only in a case where the imaging condition has regularity.

An object of the present invention is to provide an image composition apparatus, an image composition method, and a program capable of securely generating a composite image in which an obstacle image is removed from a plurality of images including the obstacle image.

In order to achieve the above object, an image composition apparatus according to one aspect of the present invention comprises an image obtaining unit that obtains a first image and a second image obtained by imaging a target object and an obstacle which is closer to an imaging apparatus than the target object is by the imaging apparatus from a first direction and a second direction, a display control unit that displays the first image and the second image on a display screen, a region specifying unit that specifies a target object region by receiving a region designation indicating the target object region in which the target object is captured and the obstacle is not captured on the first image and the second image displayed on the display screen, a correspondence point information obtaining unit that obtains correspondence point information indicating correspondence points between the first image and the second image, a geometric transformation information obtaining unit that obtains geometric transformation information used in a case of geometrically transforming the target object region of the second image with respect to the first image based on the correspondence point information, a geometric transformation unit that geometrically transforms the target object region of the second image based on the geometric transformation information, and an image composition unit that generates a composite image by compositing the target object region of the first image with the geometrically transformed target object region of the second image.

According to one aspect of the present invention, the target object region is specified by receiving the region designation indicating the target object region in which the target object is captured and the obstacle is not captured on the first image and the second image displayed on the display screen. The correspondence point information indicating the correspondence points between the first image and the second image is obtained. The geometric transformation information used in the case of geometrically transforming the target object region of the second image with respect to the first image is obtained based on the correspondence point information. The target object region of the second image is geometrically transformed based on the geometric transformation information. The composite image is generated by compositing the target object region of the first image with the target object region of the second image. Thus, the composite image in which an object image is canceled out can be securely generated from a plurality of images including the object image even in a case where, for example, an imaging condition significantly changes.

In the image composition apparatus according to another aspect of the present invention, the region specifying unit specifies a surrounding region that is a region surrounding the target object region in the second image and is a region except a region in which the obstacle is captured. The geometric transformation unit geometrically transforms the surrounding region of the second image. The image composition unit generates the composite image including the geometrically transformed surrounding region of the second image. According to the present aspect, the composite image in which not only the target object region but also the surrounding region are geometrically transformed can be obtained.

In the image composition apparatus according to still another aspect of the present invention, the region specifying unit specifies the surrounding region on the same surface as the target object region.

The image composition apparatus according to still another aspect of the present invention further comprises a display switching instruction reception unit that receives a display switching instruction indicating whether to display the composite image in which the target object region is geometrically transformed or display the composite image in which the target object region and the surrounding region are geometrically transformed. The display control unit displays the composite image on the display screen in response to the display switching instruction. According to the present aspect, the composite image in which only the target object region is geometrically transformed and the composite image in which the target object region and the surrounding region are geometrically transformed can be displayed in a switched manner.

In the image composition apparatus according to still another aspect of the present invention, the region specifying unit specifies the target object region by tracing an edge of the target object region in the first image and the second image based on a region designation indicating a part of the target object region. According to the present aspect, the target object region is specified by simply designating a part of the target object region without designating the whole target object region. Thus, it is possible to both securely cancel out the obstacle image and reduce the complexity of the region designation.

In the image composition apparatus according to still another aspect of the present invention, the correspondence point information obtaining unit obtains the correspondence point information by receiving a designation of correspondence points between the first image and the second image in the target object region on the first image and the second image displayed on the display screen. According to the present aspect, even in a case where it is difficult to obtain the correspondence point information by image analysis, the geometric transformation information can be securely obtained based on the correspondence point information obtained by receiving the designation of the correspondence points.

In the image composition apparatus according to still another aspect of the present invention, the correspondence point information obtaining unit obtains the correspondence point information by comparing feature points between the first image and the second image. According to the present aspect, the designation of the correspondence points can be omitted in a case where the correspondence point information can be obtained by image analysis (comparison of feature points).

In the image composition apparatus according to still another aspect of the present invention, the correspondence point information obtaining unit obtains the correspondence point information indicating correspondence points between the first image and the second image in at least any one region of the target object region or a surrounding region that is a region surrounding the target object region and is a region except a region in which the obstacle is captured. According to the present aspect, the accuracy of the geometric transformation information can be increased by obtaining the correspondence point information excluding the obstacle region. In addition, even in a case where it is difficult to obtain the correspondence point information in the target object region, the geometric transformation information can be securely obtained by obtaining the correspondence point information from the surrounding region.

An image composition method according to still another aspect of the present invention comprises a step of obtaining a first image and a second image obtained by imaging a target object and an obstacle which is closer to an imaging apparatus than the target object is by the imaging apparatus from a first direction and a second direction, a step of displaying the first image and the second image on a display screen, a step of specifying a target object region by receiving a region designation indicating the target object region in which the target object is captured and the obstacle is not captured on the first image and the second image displayed on the display screen, a step of obtaining correspondence point information indicating correspondence points between the first image and the second image, a step of obtaining geometric transformation information used in a case of geometrically transforming the target object region of the second image with respect to the first image based on the correspondence point information, a step of geometrically transforming the target object region of the second image based on the geometric transformation information, and a step of generating a composite image by compositing the target object region of the first image with the geometrically transformed target object region of the second image.

An image composition program according to still another aspect of the present invention causes a computer to execute the image composition method.

According to the present invention, the composite image in which the obstacle image is canceled out can be securely generated from a plurality of images including the obstacle image.

DESCRIPTION OF THE PREFERRED EMBODIMENTS

Hereinafter, embodiments of an image composition apparatus, an image composition method, and a program according to the present invention will be described using the appended drawings.

First Embodiment

An image composition apparatus of a first embodiment according to the present invention will be described.

Figure 1:
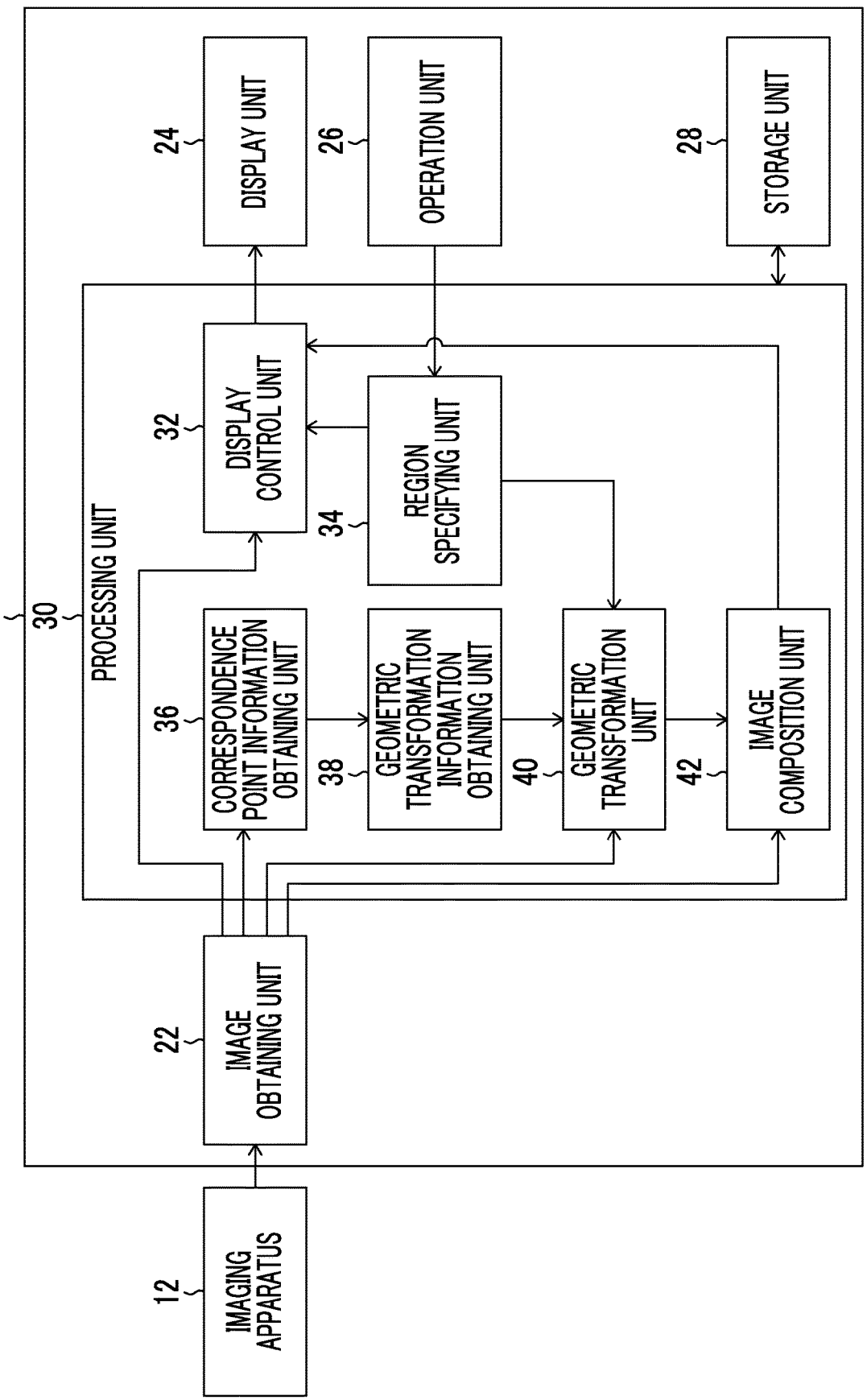
FIG. 1 is a block diagram illustrating a configuration example of an image composition apparatus of a first embodiment according to the present invention.

FIG. 1 is a block diagram illustrating a configuration example of the image composition apparatus according to embodiments of the present invention. An image composition apparatus 10 of the present example comprises an image obtaining unit 22 obtaining a plurality of images (hereinafter, referred to as the "captured images") obtained by imaging a target object by an imaging apparatus 12, a display unit 24 including a display screen capable of displaying an image, an operation unit 26 receiving an operation of a user, a storage unit 28 storing a program and information necessary for executing the program, and a processing unit 30 executing various processes in accordance with the program.

The image obtaining unit 22 is configured with, for example, a communication device. The image obtaining unit 22 is not limited to a communication device directly communicating with the imaging apparatus 12 such as a digital camera or a smartphone by wired communication or wireless communication. For example, the image obtaining unit 22 may be a communication device communicating with a storage device such as a database through a network. The image obtaining unit 22 may be configured with an interface device for a recording medium such as a memory card. The display unit 24 is configured with a display device such as a liquid crystal display device. The operation unit 26 is configured with an operation device receiving the operation of the user. The storage unit 28 is configured with a transitory storage device and a non-transitory storage device. The program is stored in the non-transitory storage device. The processing unit 30 is configured with, for example, a central processing unit (CPU) that is one form of a computer.

The processing unit 30 comprises a display control unit 32 displaying the plurality of images obtained by the image obtaining unit 22 on the display screen of the display unit 24, a region specifying unit 34 specifying a target object region of each image displayed on the display screen of the display unit 24, a correspondence point information obtaining unit 36 obtaining correspondence point information indicating correspondence points between the plurality of images displayed on the display screen of the display unit 24, a geometric transformation information obtaining unit 38 obtaining geometric transformation information based on the correspondence point information obtained by the correspondence point information obtaining unit 36, a geometric transformation unit 40 geometrically transforming the target object regions of the plurality of images obtained by the image obtaining unit 22 based on the geometric transformation information obtained by the geometric transformation information obtaining unit 38, and an image composition unit 42 generating a composite image by compositing the plurality of images.

Figure 2:
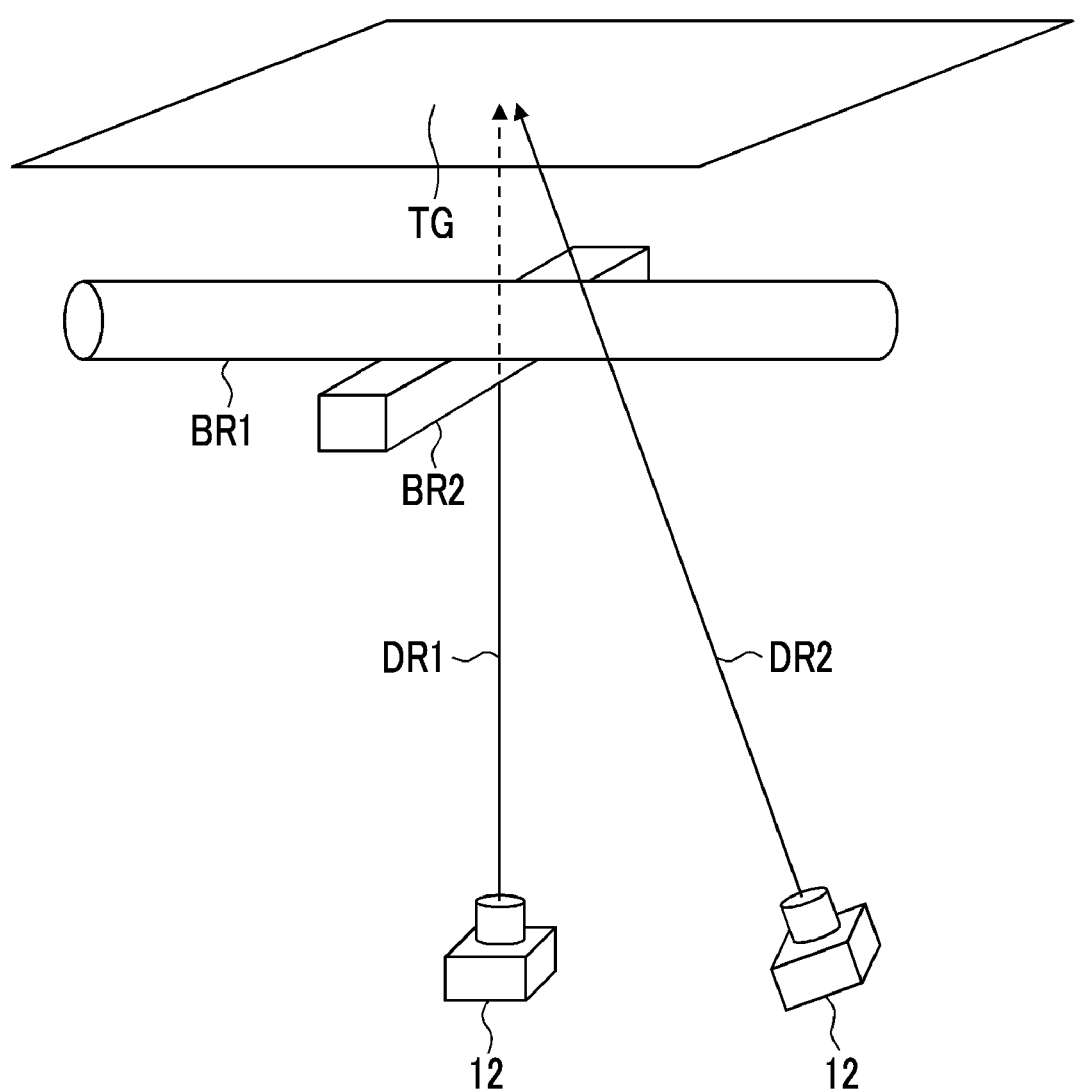
FIG. 2 is a diagram illustrating a state where a target object and an obstacle are imaged from a plurality of imaging directions.

For example, as illustrated in FIG. 2, the image obtaining unit 22 obtains a first image obtained by imaging a target object TG and obstacles BR1 and BR2 by the imaging apparatus 12 from a first imaging direction DR1 (hereinafter, simply referred to as the "first direction") and a second image obtained by imaging the target object TG and the obstacles BR1 and BR2 by the imaging apparatus 12 from a second imaging direction DR2 (hereinafter, simply referred to as the "second direction") different from the first direction DR1. The obstacles BR1 and BR2 of the present example are closer to the imaging apparatus 12 than the target object TG.

Figure 3:
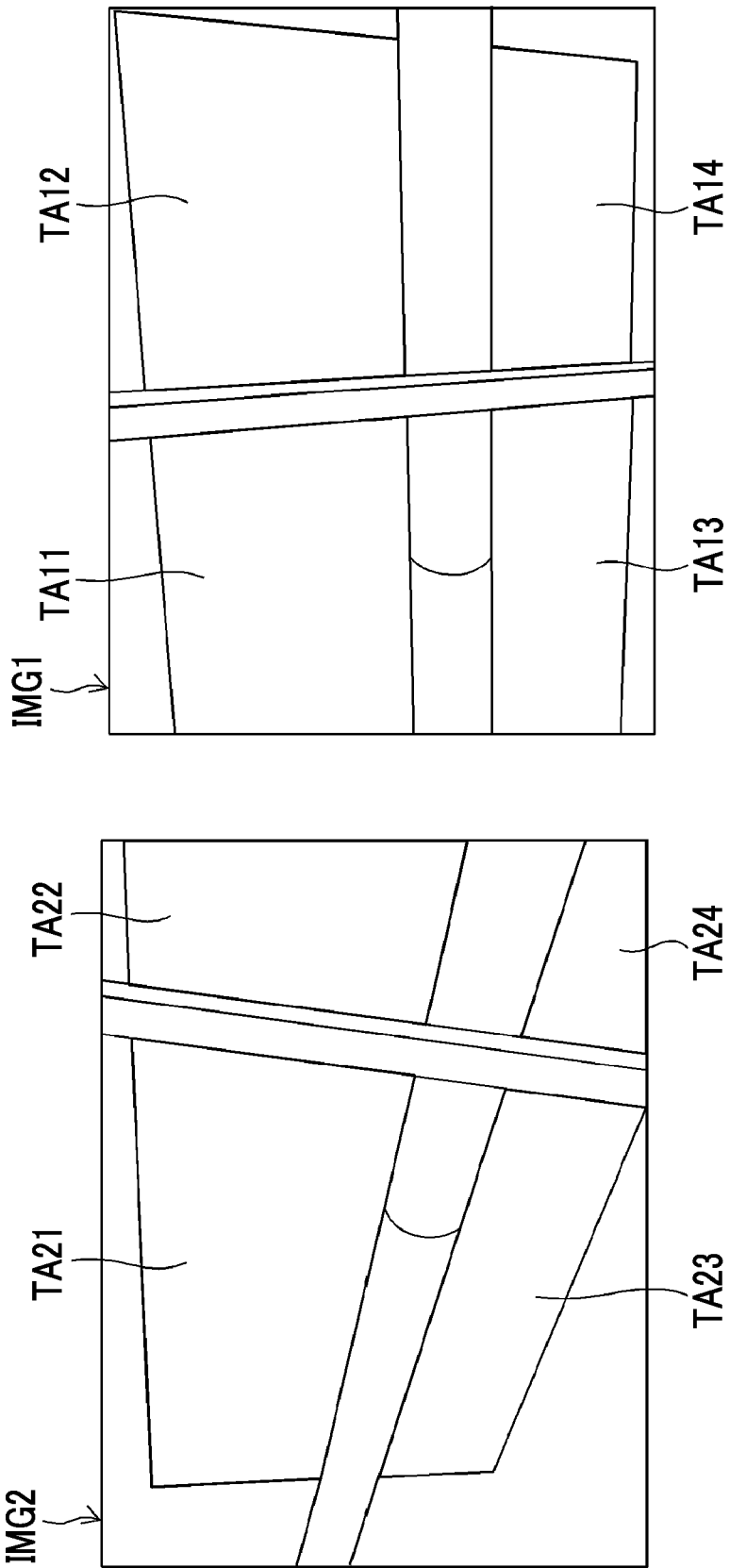
FIG. 3 is a diagram illustrating an example of a plurality of images obtained by imaging the target object and the obstacle from the plurality of imaging directions.

For example, as illustrated in FIG. 3, the display control unit 32 displays a first image IMG1 and a second image IMG2 obtained by the image obtaining unit 22 on the display screen of the display unit 24.

The region specifying unit 34 specifies target object regions (TA11 to TA14) of the first image IMG1 and target object regions (TA21 to TA24) of the second image IMG2 by receiving a region designation indicating the target object regions (TA1, TA12, TA13, TA14, TA21, TA22, TA23, and TA24) in which the target object is captured and the obstacle is not captured on the first image IMG1 and the second image IMG2 displayed on the display screen of the display unit 24.

The correspondence point information obtaining unit 36 obtains the correspondence point information indicating correspondence points that are feature points corresponding between the first image IMG1 and the second image IMG2 displayed on the display screen of the display unit 24.

The geometric transformation information obtaining unit 38 obtains, for example, a projective transformation matrix as the geometric transformation information used in the case of geometrically transforming the second image IMG2 with respect to the first image IMG1. The geometric transformation information is not limited to the projective transformation matrix. The geometric transformation information may be information used in the case of geometrically transforming the target object region of the second image IMG2 with respect to the first image IMG1.

The geometric transformation unit 40 geometrically transforms the target object regions (TA21 to TA24) of the second image IMG2. For example, projective transformation is executed.

The image composition unit 42 generates the composite image by compositing the target object regions (TA11 to TA14) of the first image IMG1 with the target regions (TA21 to TA24) of the geometrically transformed second image IMG2.

<Imaging Condition>

Figure 4:
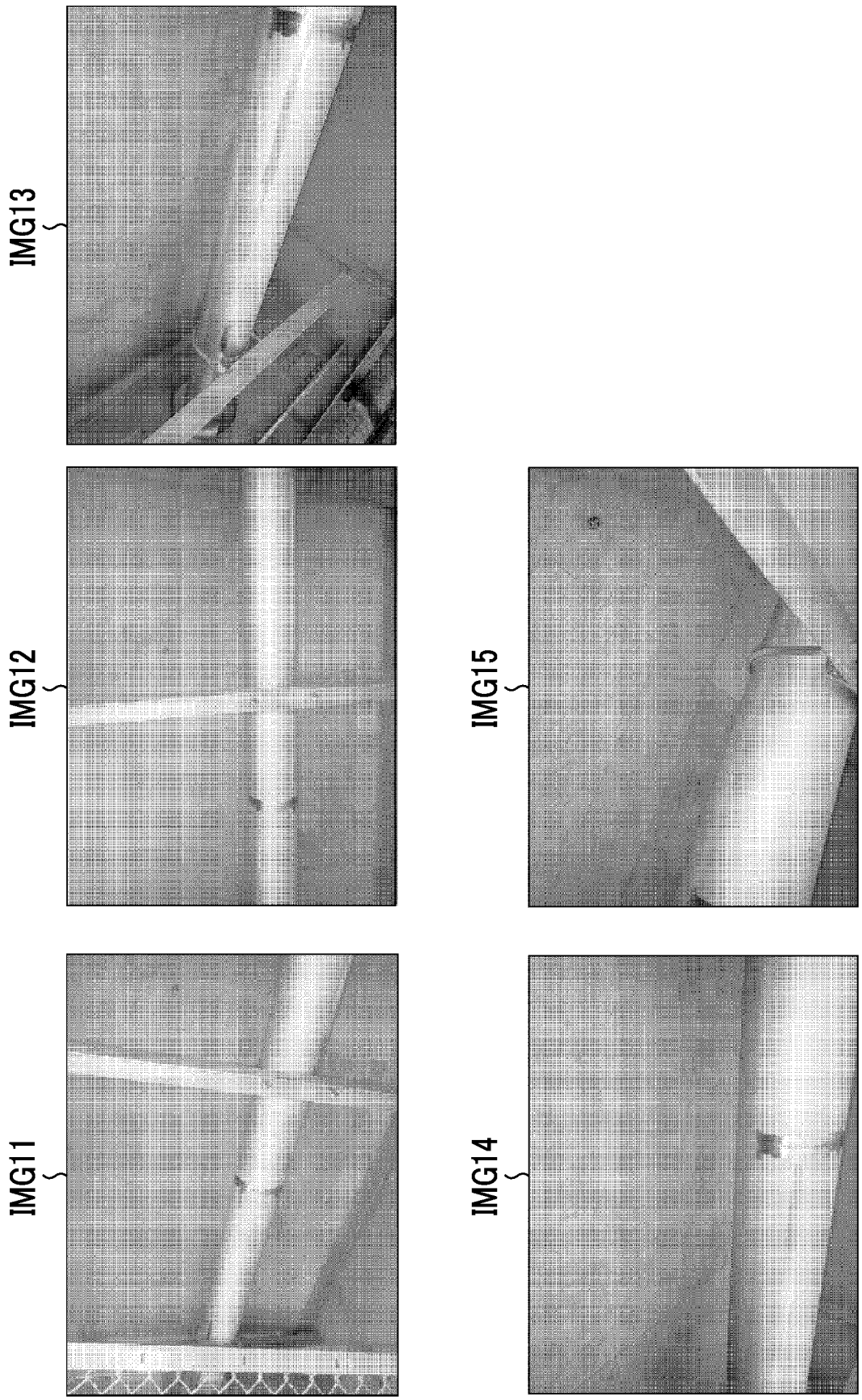
FIG. 4 is a diagram illustrating an example of an image obtained by imaging the target object and the obstacle without sufficiently avoiding the obstacle.

In FIG. 4, images IMG11, IMG12, IMG13, IMG14, and IMG15 are a plurality of captured images obtained by imaging a floor slab of a bridge as a common target object by the imaging apparatus 12. In a case where an obstacle such as a pipe is present in front of the floor slab (that is, between the target object and the imaging apparatus 12), and the floor slab is imaged by avoiding the obstacle, a change in tilt angle (angle formed between an imaging optical axis of the imaging apparatus 12 and the surface of the floor slab), a change in rotation angle (angle about the imaging optical axis of the imaging apparatus 12), and a change in imaging distance (distance between the imaging apparatus 12 and the floor slab) are increased. In a case where such a change in imaging condition (the tilt angle, the rotation angle, and the imaging distance) is increased, a correspondence of the feature point between the captured images generally may not be automatically decided. Furthermore, in a case where imaging cannot be performed by sufficiently avoiding the obstacle, the target object is excluded by the obstacle image of the pipe or the like as is understood from the images of the reference signs IMG11 to IMG15 in the drawing. Thus, it is required to be capable of generating the composite image in which the obstacle image is canceled out even in a case where the imaging condition significantly changes due to the presence of the obstacle between the target object and the imaging apparatus 12.

In addition, it is required to be capable of canceling out the obstacle image with various characteristics of the target object and the obstacle. For example, even in a case where the noticeability of the target object is low, the composite image in which the obstacle image is canceled out is required in the same manner as a case where the noticeability of the target object is high. In addition, even in a case where the characteristics (shape, color, figure, and the like) of the obstacle is not determined or not clear, the composite image in which the obstacle image is canceled out is required in the same manner as a case where the obstacle has constant and known characteristics.

<Image Processing Example in First Embodiment>

Figure 5:
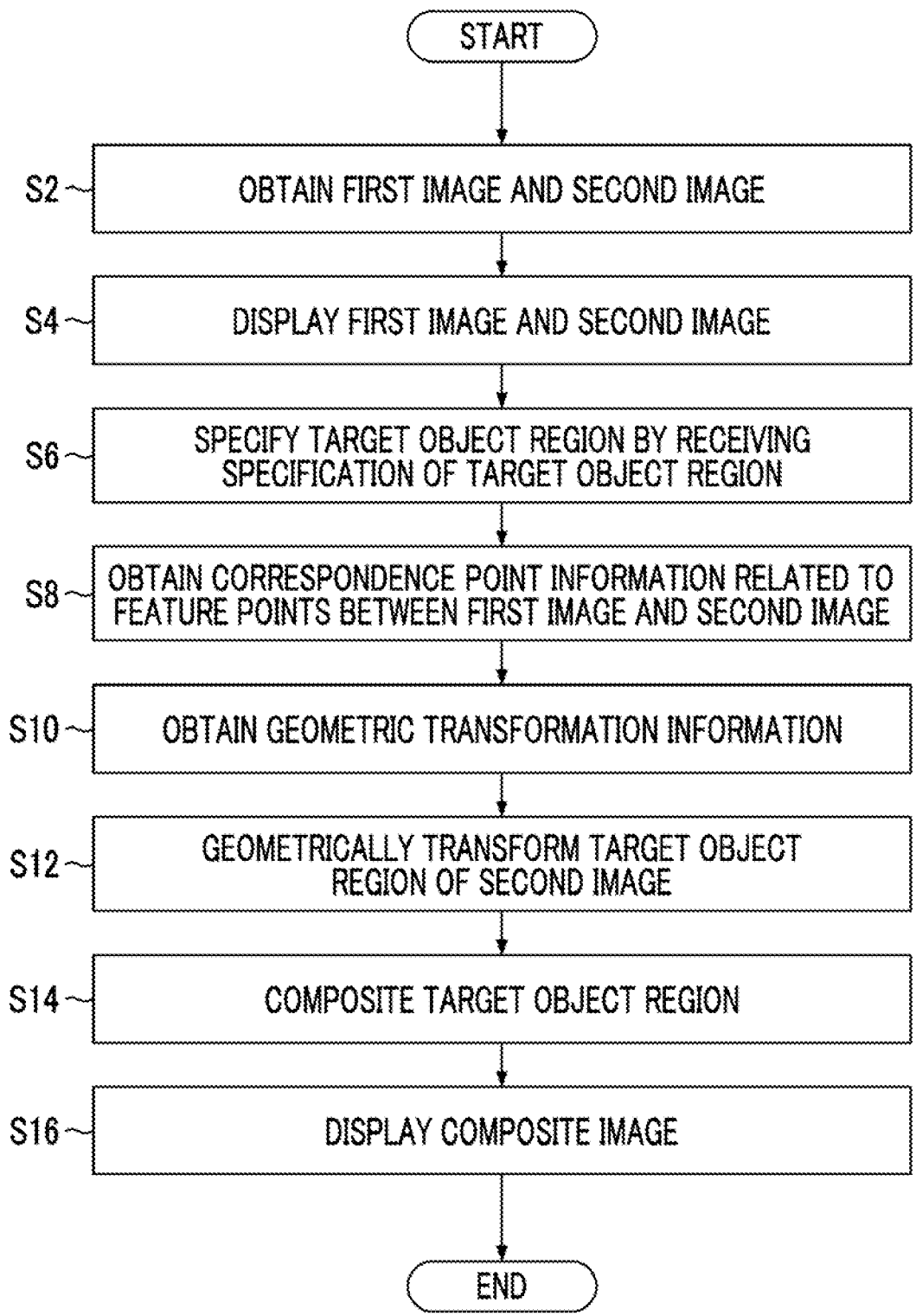
FIG. 5 is a flowchart illustrating a flow of image processing example in the first embodiment.

An image processing example in the first embodiment to which the image composition method according to the embodiments of the present invention is applied will be described using the flowchart in FIG. 5. The image processing of the present example is executed by controlling the processing unit 30 in accordance with the program stored in the storage unit 28.

First, the image obtaining unit 22 obtains the first image IMG1 obtained by imaging the target object and the obstacle by the imaging apparatus 12 from the first direction and the second image IMG2 obtained by imaging the target object and the obstacle by the imaging apparatus 12 from the second direction different from the first direction (step S2).

Next, the display control unit 32 displays the first image IMG1 and the second image IMG2 on the display screen of the display unit 24 (step S4).

Next, the operation unit 26 specifies the target object region by receiving the region designation indicating the target object region in which the target object is captured and the obstacle is not captured on the first image IMG1 and the second image IMG2 displayed on the display screen of the display unit 24 (step S6).

Next, the correspondence point information obtaining unit 36 obtains the correspondence point information indicating the correspondence points between the first image IMG1 and the second image IMG2 (step S8).

Next, based on the correspondence point information, the geometric transformation information obtaining unit 38 obtains the projective transformation matrix (geometric transformation information) used in the case of geometrically transforming the second image IMG2 with respect to the first image IMG1 (step S10).

Next, the geometric transformation unit 40 projectively transforms (geometrically transforms) the target object region of the second image IMG2 based on the obtained projective transformation matrix (geometric transformation information) (step S12).

Next, the image composition unit 42 generates the composite image by compositing the target object region of the first image with the geometrically transformed target object region of the second image (step S14).

Next, the display control unit 32 displays the composite image on the display screen of the display unit 24 (step S16).

Second Embodiment

An image composition apparatus of a second embodiment according to the present invention will be described. The contents of the previous descriptions of the same constituents as the image composition apparatus of the first embodiment will not be repeated below.

The region specifying unit 34 specifies a surrounding region that is a region surrounding the target object region and is a region except the obstacle region in which the obstacle is captured in the image (captured image) obtained by imaging the target object by the imaging apparatus 12. For example, in the second image IMG2 illustrated in FIG. 6, surrounding regions (SA21, SA22, and SA23) surrounding the target regions (TA21, TA22, TA23, and TA24) are specified. The region specifying unit 34 of the present example specifies the surrounding regions (SA21, SA22, and SA23) that are present on the same surface as the target object regions (TA21, TA22, TA23, and TA24).

The geometric transformation unit 40 geometrically transforms (in the present example, projectively transforms) the surrounding region specified by the region specifying unit 34. That is, the geometric transformation unit 40 of the present embodiment sets a geometric transformation target region by receiving the region designation and increasing the specified target object region. The surrounding regions SA21, SA22, and SA23 of the present example are on the same surface as the target object regions TA21, TA22, TA23, and TA24. Thus, the surrounding regions SA21. SA22, and SA23 may be geometrically transformed using the geometric transformation information used in the geometric transformation of the target object regions TA21, TA22, TA23, and TA24.

The image composition unit 42 generates the composite image including the geometrically transformed surrounding region.

The operation unit 26 (one form of a "display switching instruction reception unit") receives a display switching instruction indicating whether to display the composite image in which the target object region is geometrically transformed on the display screen of the display unit 24 or display the composite image in which the target object region and the surrounding region are geometrically transformed on the display screen of the display unit 24. That is, the operation unit 26 receives an instruction to switch between ON and OFF states of the display of the surrounding region which is a region increased from the target object region.

The display control unit 32 displays the composite image on the display screen in response to the display switching instruction received by the operation unit 26.

<Image Processing Example in Second Embodiment>

Figure 7:
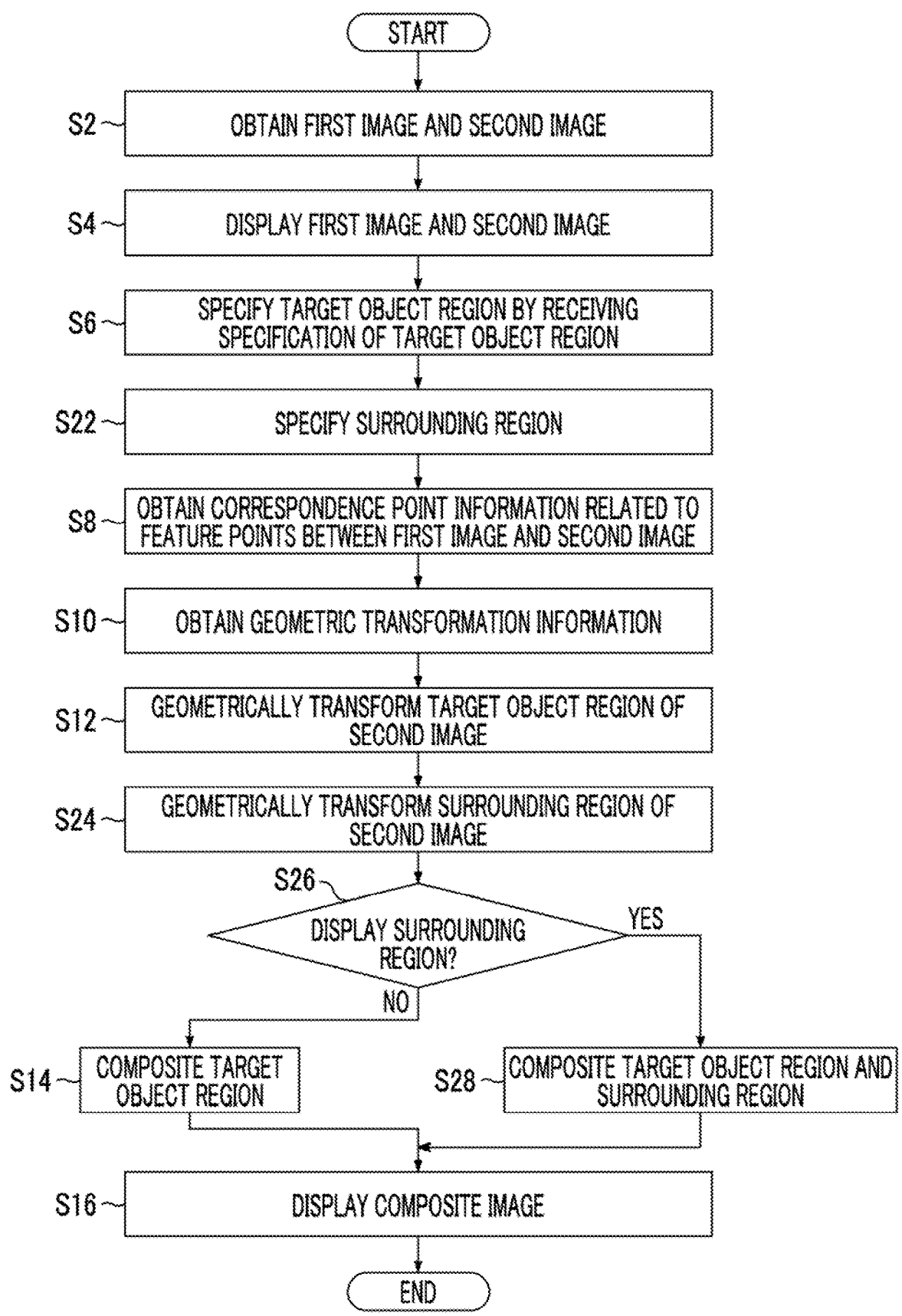
FIG. 7 is a flowchart illustrating a flow of image processing example in a second embodiment.

An image processing example in the second embodiment to which the image composition method according to the embodiments of the present invention is applied will be described using the flowchart in FIG. 7. The image processing of the present example is executed by controlling the processing unit 30 in accordance with the program stored in the storage unit 28. The same steps as the image processing example in the first embodiment illustrated in FIG. 5 will be designated by the same reference signs, and the contents of the previous descriptions of such steps will not be repeated.

Steps S2 to S6 are the same as those of the image processing example of the first embodiment.

Next, the region specifying unit 34 specifies the surrounding region which is the region surrounding the target object region and is a region except the obstacle region in which the obstacle is captured in the second image IMG2 displayed on the display screen of the display unit 24 (step S22). For example, a region on the same surface as the target object region (region having almost the same distance from the imaging apparatus 12) is specified as the surrounding region. The surrounding region may be specified using the color, figure, or shape of the region or a combination thereof in the captured image. The user may designate the surrounding region by the operation unit 26.

Subsequent steps S8 to S12 are the same as those of the image processing example of the first embodiment.

Next, the geometric transformation unit 40 projectively transforms (geometrically transforms) the surrounding region of the second image IMG2 specified in step S22 based on the projective transformation matrix (geometric transformation information) calculated in step S10 (step S24).

Next, in step S26, a determination as to whether or not to display the surrounding region on the display screen of the display unit 24 is performed. That is, the processing unit 30 determines whether or not an instruction to display the composite image in which the target object region and the surrounding region are geometrically transformed is received by the operation unit 26 (display switching instruction reception unit).

In a case where the instruction to display the composite image in which the target object region and the surrounding region are geometrically transformed is received (in the case of YES in step S26), the image composition unit 42 composites the images of the target object region and the surrounding region (step S28). In the case of NO in step S26, the image composition unit 42 composites the image of the target object region (step S14).

Next, the display control unit 32 displays the composite image on the display screen of the display unit 24 (step S16).

<Various Aspects of Target Object Region Specification>

Various aspects of the target object region specification by the region specifying unit 34 will be described.

As illustrated in FIG. 2, in a case where the obstacles BR1 and BR2 are present, and imaging cannot be performed by positioning the imaging apparatus 12 between the target object TG (in the present example, the lower surface of the floor slab of the bridge) and the obstacles BR1 and BR2 (for example, pipes), the obstacle image is captured in the captured image (for example, the first image IMG1 and the second image IMG2 illustrated in FIG. 3). Aspects of the target object region specification in such a case include, first, an aspect of receiving the region designation by a manual operation and, second, an aspect of specifying the target object region using a combination of the reception of the region designation by the manual operation and image analysis.

Figure 8:
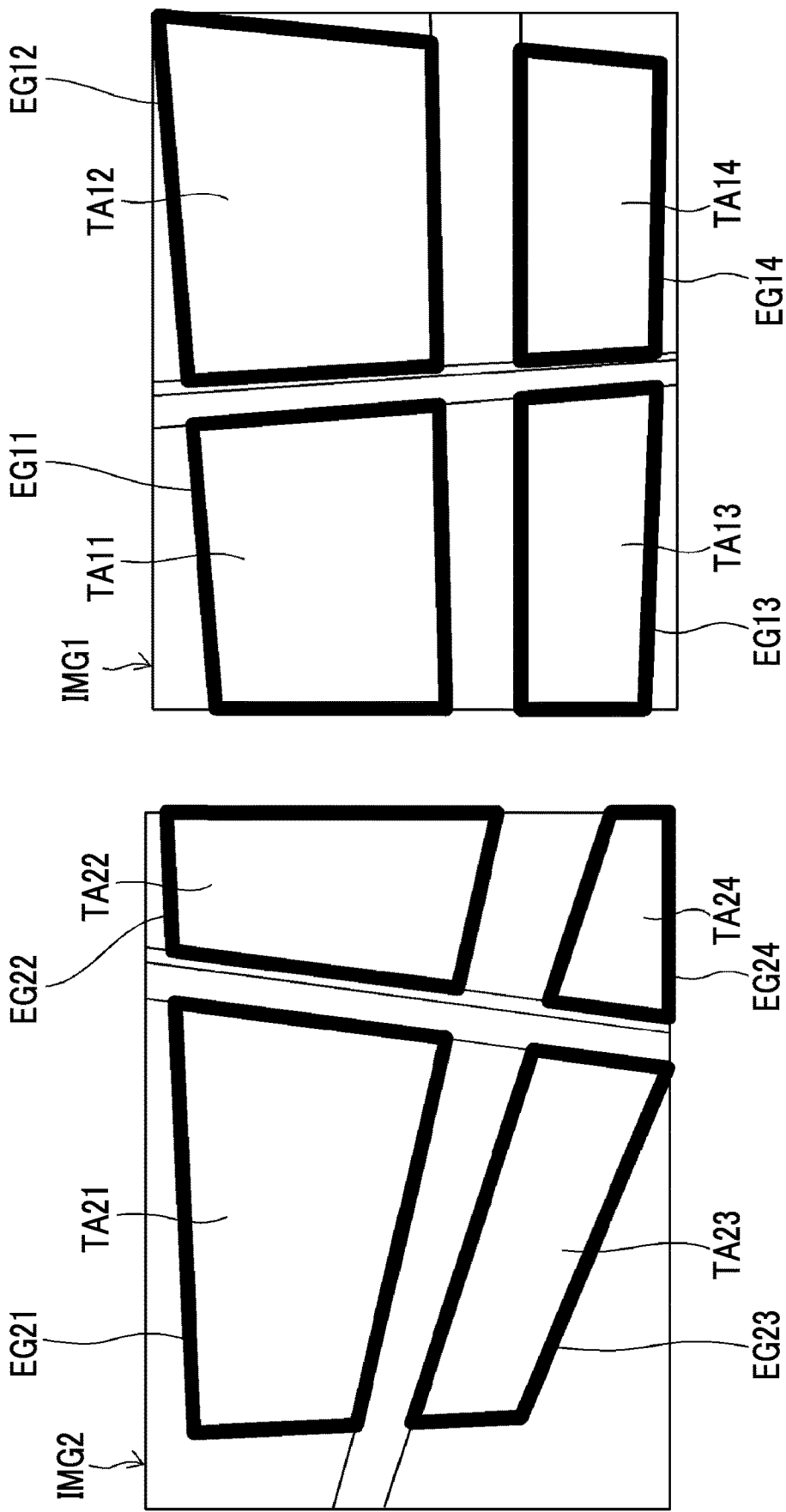
FIG. 8 is a descriptive diagram used in a description of a first aspect of target object region specification.

For example, as illustrated in FIG. 8, the operation unit 26 receives a manual operation indicating a polygonal shape including edges EG11, EG12, EG13, and EG14 of the target object regions TA11, TA12, TA13, and TA14 of the first image IMG1 and a manual operation indicating a polygonal shape including edges EG21, EG22, EG23, and EG24 of the target object regions TA21, TA22. TA23, and TA24 of the second image IMG2. By receiving the manual operation indicating the edges of the target object region, the region specifying unit 34 can specify the target object region.

Figure 9:
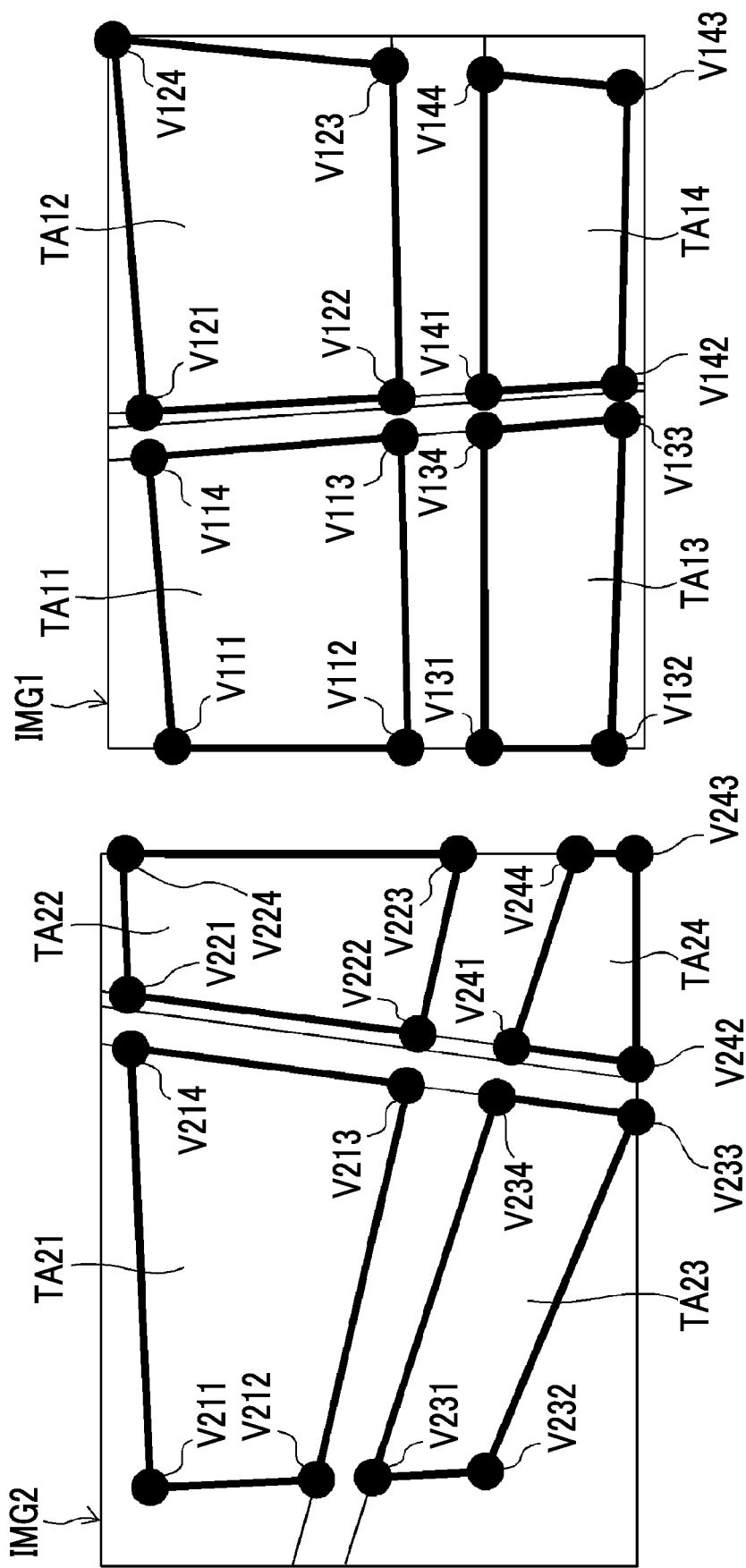
FIG. 9 is a descriptive diagram used in a description of a second aspect of the target object region specification.

For example, as illustrated in FIG. 9, the operation unit 26 may receive a manual operation indicating vertexes (V111 to V114, V121 to V124, V131 to V134, and V141 to V144) of the polygonal shapes of the target object regions (TA11 to TA14) of the first image IMG1 and a manual operation indicating vertexes V211 to V214, V221 to V224, V231 to V234, and V241 to V244 of the polygonal shapes of the target object regions (TA21 to TA24) of the second image IMG2. By receiving the manual operation indicating the vertexes of the target object region, the region specifying unit 34 can specify the target object region.

Figure 10:
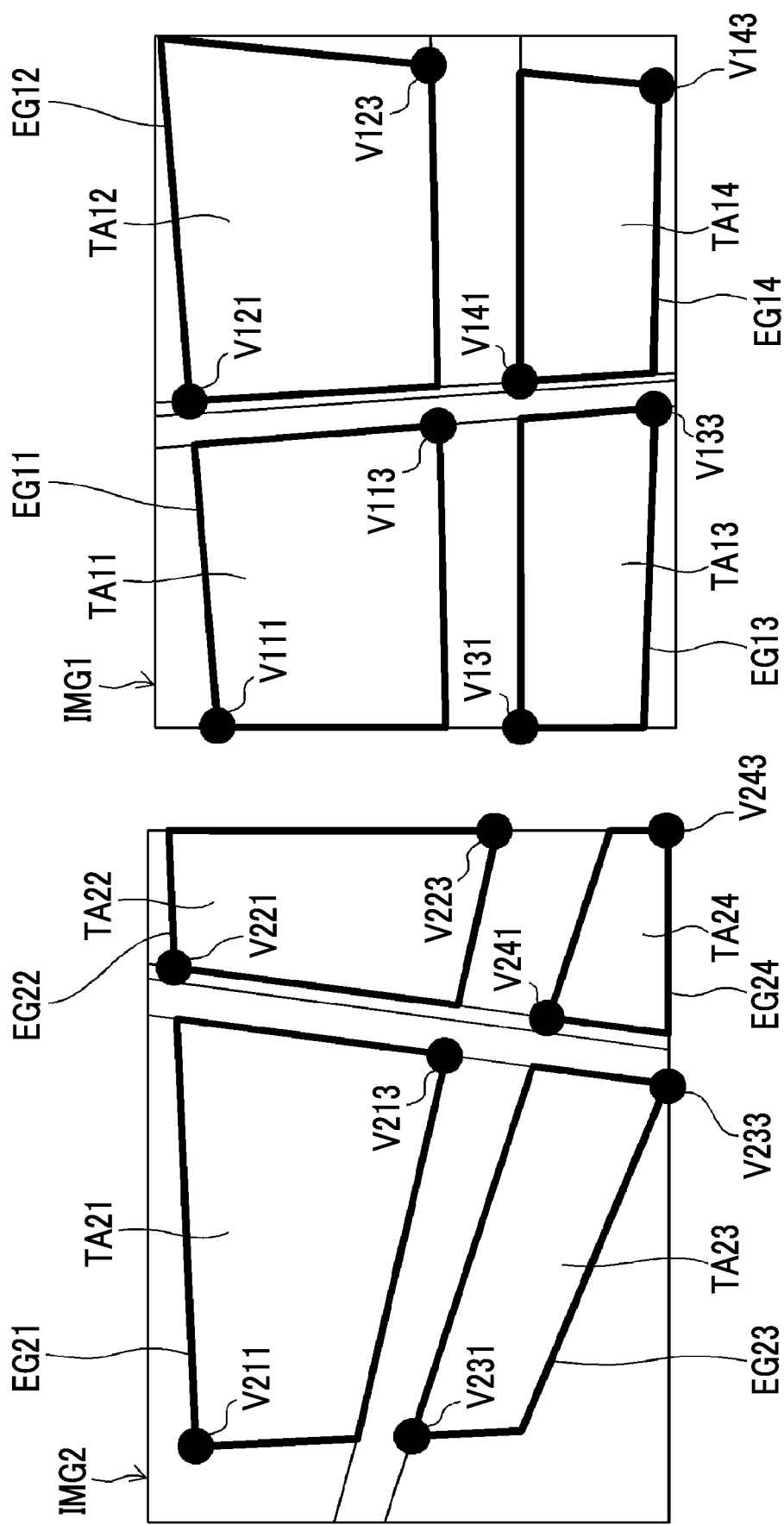
FIG. 10 is a descriptive diagram used in a description of a third aspect of the target object region specification.

FIG. 10 illustrates a case of receiving a manual operation indicating only a part (V111, V113, V121, V123. V131, V133, V141, V143, V211, V213, V221, V223, V231, V233, V241, and V243) of a plurality of vertexes of the polygonal shapes of the target object regions (TA11 to TA14 and TA21 to TA24) and detecting the edges EG11 to EG14 and the edges EG21 to EG24 by image analysis based on the designation of the vertexes. That is, the region specifying unit 34 specifies each target object region by tracing the edges of the target object regions (TA11 to TA14) in the first image IMG1 and the edges of the target object regions (TA21 to TA24) in the second image IMG2 based on the region designation indicating a part (for example, vertexes of a part of a plurality of vertexes showing each target object region) of the target object regions (TA11 to TA14 and TA21 to TA24). The region specifying unit 34 may specify the target object region by combining the reception of the region designation by a manual operation with image analysis.

In the above description, the case of specifying the target object region by directly receiving the region designation indicating the target object region is described. However, by receiving a region designation indicating the obstacle region, the present invention may also be applied to a case of specifying the target object region by indirectly receiving the region designation indicating the target object region. That is, in a case where the target object region (or the sum of the target object region and the surrounding region) and a non-obstacle region are the same or have a correspondence, the reception of the region designation indicating the obstacle region can be regarded as the reception of the target object region (or the sum of the target object region and the surrounding region).

<Various Aspects of Obtaining Correspondence Point Information>

Various aspects of obtaining the correspondence point information by the correspondence point information obtaining unit 36 will be described.

Figure 11:
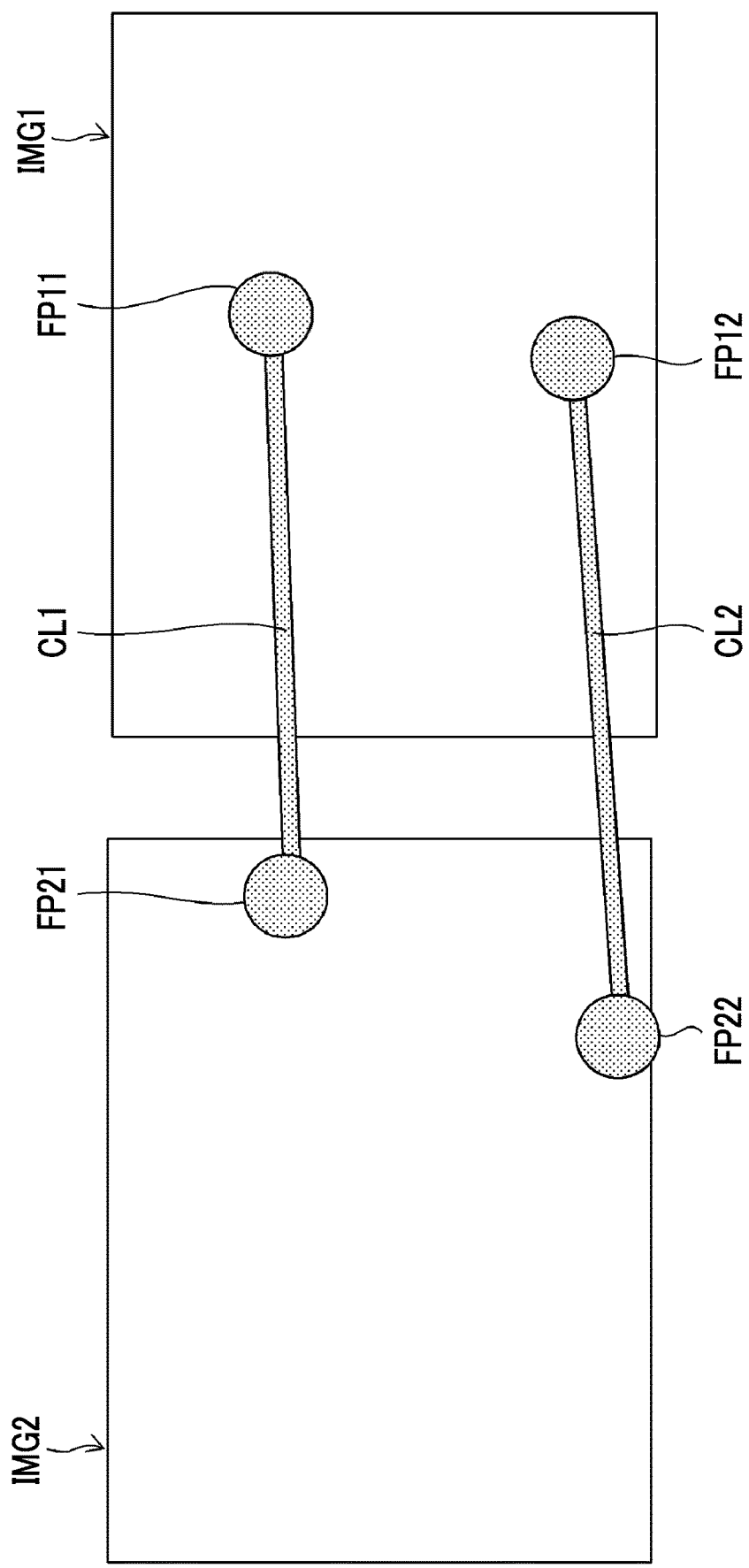
FIG. 11 is a descriptive diagram used in a description of obtaining correspondence point information.

A first aspect is an aspect of obtaining the correspondence point information by displaying the first image IMG1 and the second image IMG2 on the display screen of the display unit 24 and receiving a designation of the correspondence points between the first image IMG1 and the second image IMG2. For example, it is assumed that the plurality of captured images (the first image IMG1 and the second image IMG2) illustrated in FIG. 3 are obtained by imaging by the imaging apparatus 12. For example, the correspondence point information obtaining unit 36 obtains the correspondence point information by receiving a designation of the correspondence points between the first image IMG1 and the second image IMG2 in the target regions (TA11 to TA14 and TA21 to TA24) by the operation unit 26 on the first image IMG1 and the second image IMG2 displayed on the display screen of the display unit 24. FIG. 11 illustrates a state where the operation unit 26 receives a straight line CL1 indicating a combination (correspondence points) of a feature point FP11 of the first image IMG1 and a feature point FP21 of the second image IMG2 and a straight line CL2 indicating a combination (correspondence points) of a feature point FP12 of the first image IMG1 and a feature point FP22 of the second image IMG2. In the case of receiving the designation of the correspondence points by only a manual operation, a designation of four or more sets of correspondence points (in the present example, a designation of four straight lines) may be received.

A second aspect is an aspect of obtaining the correspondence point information by performing image analysis on the first image IMG1 and the second image IMG2. For example, the correspondence point information obtaining unit 36 obtains the correspondence point information by comparing the feature points in the target object regions (TA11 to TA14 and TA21 to TA24) between the first image IMG1 and the second image IMG2.

A third aspect is an aspect of obtaining the correspondence point information by combining the aspect (first aspect) of receiving the designation of the correspondence points by a manual operation with the aspect (second aspect) of performing image analysis. For example, as illustrated in FIG. 3, the correspondence point information obtaining unit 36 receives a designation of one set of correspondence points by the operation unit 26 on the first image IMG1 and the second image IMG2 displayed on the display screen of the display unit 24. The correspondence point information obtaining unit 36 detects other sets of correspondence points by image analysis. As illustrated in FIG. 11, a designation of two sets of correspondence points may be received by the operation unit 26, and other sets of correspondence points may be detected by image analysis. In the case of detecting other sets of correspondence points by image analysis, the correspondence point information obtaining unit 36 can increase the accuracy of the correspondence point detection by limiting a detection condition for other sets of correspondence points based on the correspondence points received by the operation unit 26. For example, a search scope of other sets of correspondence points can be limited based on the position of the set of the correspondence points designated in each captured image.

Figure 6:
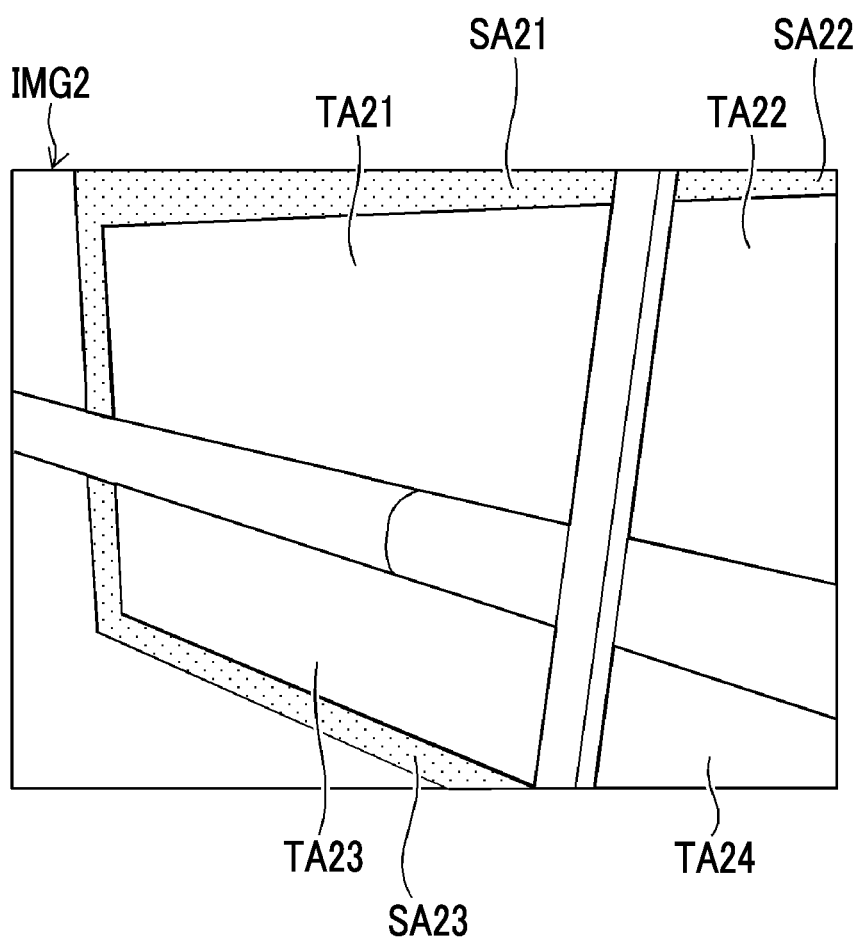
FIG. 6 is a descriptive diagram used in a specific description of a surrounding area surrounding a target object region.

Obtaining the correspondence point information by the correspondence point information obtaining unit 36 is not limited to a case of obtaining the correspondence point information indicating the correspondence points in the target object region. As illustrated in FIG. 6, the correspondence point information in the surrounding regions (SA21 to SA23) which are the regions surrounding the target regions (TA21 to TA24) and are regions except the obstacle region may be obtained.

In the above description of the present specification, the case of compositing the second image IMG2 in the first image IMG1 is described as an example. However, the "second image" in the embodiments of the present invention is not limited to one image. The present invention may be applied to a case of compositing two or more "second images" in one "first image". The plurality of "second images" may have different imaging conditions (for example, the imaging direction, the imaging position, the tilt angle, the rotation angle, and the imaging distance).

In addition, the processing unit 30 illustrated in FIG. 1 can be configured to include various processors as follows. The various processors include a central processing unit (CPU)

as a general-purpose processor executing various processes by software (program), a programmable logic device (PLD) such as a field programmable gate array (FPGA) as a processor capable of changing a circuit configuration after manufacturing, a dedicated electric circuit such as an application specific integrated circuit (ASIC) as a process having a circuit configuration dedicatedly designed for executing a specific process, and the like. In the above embodiments, the function of the image composition apparatus 10 may be implemented by one of the various processors or may be implemented by two or more processors of the same type or different types (for example, a plurality of FPGAs or a combination of a CPU and an FPGA). In addition, a plurality of functions may be implemented by one processor. As an example of implementing the plurality of functions by one processor, a processor that implements the function of the whole system including the plurality of functions using one integrated circuit (IC) chip as represented by a system on chip (SoC) and the like is used. Various functions are implemented using one or more of the various processors as a hardware structure. Furthermore, the hardware structure of the various processors is more specifically circuitry in which circuit elements such as a semiconductor element are combined.

In addition, the image composition apparatus 10 of the above embodiments is for illustrative purposes only. The present invention can also be applied to other configurations. Each functional configuration can be appropriately implemented by any hardware, software, or a combination thereof. For example, the present invention can be applied to an image composition program causing a computer to execute processes in each unit of the image composition apparatus 10 and a computer-readable recording medium (non-transitory recording medium) on which the image composition program is recorded.

While the embodiments of the present invention are described thus far, the present invention is not limited to the above embodiments and modification examples. Various modifications can be made without departing from the gist of the present invention.

EXPLANATION OF REFERENCES

10: image composition apparatus
12: imaging apparatus
22: image obtaining unit
24: display unit
26: operation unit (display switching instruction reception unit)
28: storage unit
30: processing unit
32: display control unit
34: region specifying unit
36: correspondence point information obtaining unit
38: geometric transformation information obtaining unit
40: geometric transformation unit
42: image composition unit
BR1, BR2: obstacle
CL1, CL2: straight line indicating correspondence points 18
DR1: first direction
DR2: second direction
EG11 to EG14, EG21 to EG24: edge
FP01, FP02, FP21, FP22: feature point
IMG1: first image
IMG2: second image
IMG11 to IMG15: image
SA21 to SA23: surrounding region
TA11 to TA14, TA21 to TA24: target object region
TG: target object
V11 to V114, V121 to V124, V131 to V134, V141 to V144, V211 to V214, V221 to V224, V231 to V234, V241 to V244: vertex

What is claimed is:

1. An image composition apparatus comprising a processor configured to:
    obtain a first image and a second image obtained by imaging a target object and an obstacle which is closer to an imager than the target object is by the imager from a first direction and a second direction;
    display the first image and the second image on a display screen;
    receive a region designation by receiving a manual operation of a user for each of the first image and the second image, the region designation indicating a target object region in which the target object is captured and the obstacle is not captured on each of the first image and the second image displayed on the display screen;
    specify the target object region for the first image and the target object region for the second image according to the received region designation;
    obtain correspondence point information indicating correspondence points between the first image and the second image;
    obtain geometric transformation information used in a case of geometrically transforming the target object region of the second image with respect to the first image based on the correspondence point information;
    geometrically transform the target object region of the second image based on the geometric transformation information; and
    generate a composite image by compositing the target object region of the first image with the geometrically transformed target object region of the second image.

2. The image composition apparatus according to claim 1, wherein the processor is configured to:
    specify a surrounding region that is a region surrounding the target object region in the second image and is a region except a region in which the obstacle is captured,
    geometrically transform the surrounding region of the second image, and
    generate the composite image including the geometrically transformed surrounding region of the second image.

3. The image composition apparatus according to claim 2, wherein the processor is further configured to:
    specify the surrounding region on the same surface as the target object region.

4. The image composition apparatus according to claim 2, wherein the processor is further configured to:
    receive a display switching instruction indicating whether to display the composite image in which the target object region is geometrically transformed or display the composite image in which the target object region and the surrounding region are geometrically transformed, and
    display the composite image on the display screen in response to the display switching instruction.

5. The image composition apparatus according to claim 1, wherein
    the processor is configured to specify the target object region by tracing an edge of the target object region in each of the first image and the second image based on a region designation indicating a part of the target object region.

6. The image composition apparatus according to claim 1, wherein
the processor is configured to obtain the correspondence point information by receiving a designation of correspondence points between the first image and the second image in the target object region on each of the first image and the second image displayed on the display screen.

7. The image composition apparatus according to claim 1, wherein
the processor is configured to obtain the correspondence point information by comparing feature points between the first image and the second image.

8. The image composition apparatus according to claim 1, wherein
the processor is configured to obtain the correspondence point information indicating correspondence points between the first image and the second image in at least any one region of the target object region or a surrounding region that is a region surrounding the target object region and is a region except a region in which the obstacle is captured.

9. An image composition method comprising:
a step of obtaining a first image and a second image obtained by imaging a target object and an obstacle which is closer to an imager than the target object is by the imager from a first direction and a second direction;
a step of displaying the first image and the second image on a display screen;
a step of receiving a region designation by receiving a manual operation of a user for each of the first image and the second image, the region designation indicating a target object region in which the target object is captured and the obstacle is not captured on each of the first image and the second image displayed on the display screen;
a step of specifying the target object region for the first image and the target object region for the second image according to the received region designation;
a step of obtaining correspondence point information indicating correspondence points between the first image and the second image;
a step of obtaining geometric transformation information used in a case of geometrically transforming the target object region of the second image with respect to the first image based on the correspondence point information;
a step of geometrically transforming the target object region of the second image based on the geometric transformation information; and
a step of generating a composite image by compositing the target object region of the first image with the geometrically transformed target object region of the second image.

10. A computer-readable, non-transitory tangible recording medium which records a program for causing a computer to perform the functions of:
obtaining a first image and a second image obtained by imaging a target object and an obstacle which is closer to an imager than the target object is by the imager from a first direction and a second direction;
displaying the first image and the second image on a display screen;
receiving a region designation by receiving a manual operation of a user for each of the first image and the second image, the region designation indicating a target object region in which the target object is captured and the obstacle is not captured on each of the first image and the second image displayed on the display screen;
specifying the target object region for the first image and the target object region for the second image according to the received region designation;
obtaining correspondence point information indicating correspondence points between the first image and the second image;
obtaining geometric transformation information used in a case of geometrically transforming the target object region of the second image with respect to the first image based on the correspondence point information;
geometrically transforming the target object region of the second image based on the geometric transformation information; and
generating a composite image by compositing the target object region of the first image with the geometrically transformed target object region of the second image.

* * * * *